March 25, 1958  C. E. TACK  2,827,984
CLASP BRAKE
Filed April 19, 1954  2 Sheets-Sheet 1

INVENTOR.
Carl E. Tack
BY
O. B. Garner
Atty.

March 25, 1958  C. E. TACK  2,827,984
CLASP BRAKE
Filed April 19, 1954  2 Sheets-Sheet 2
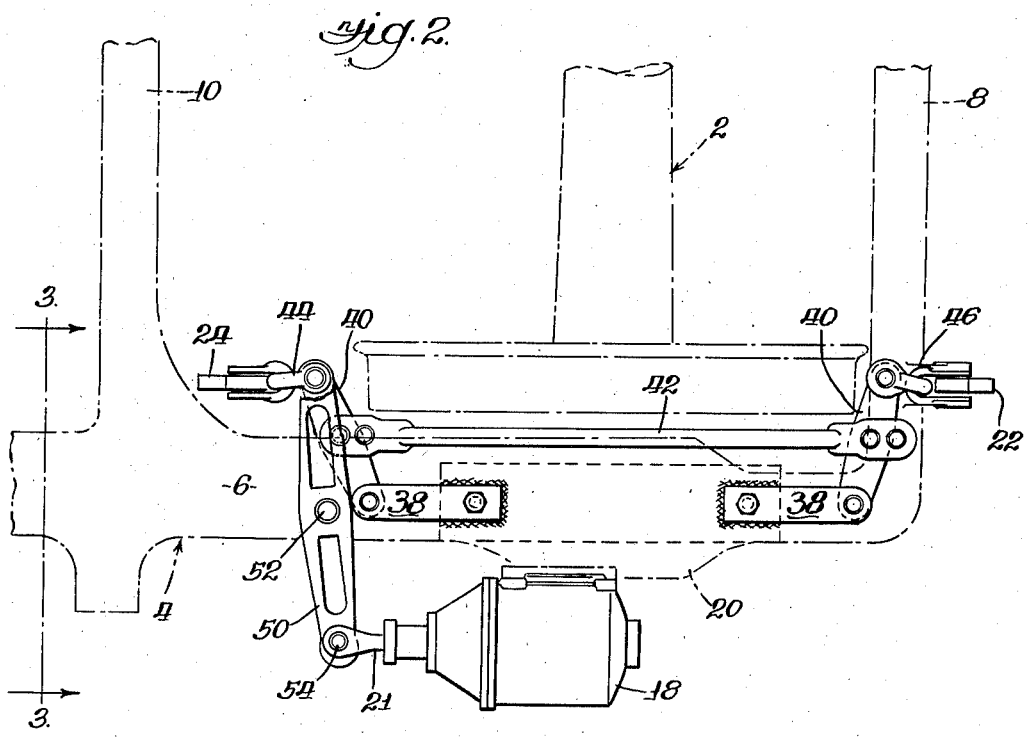
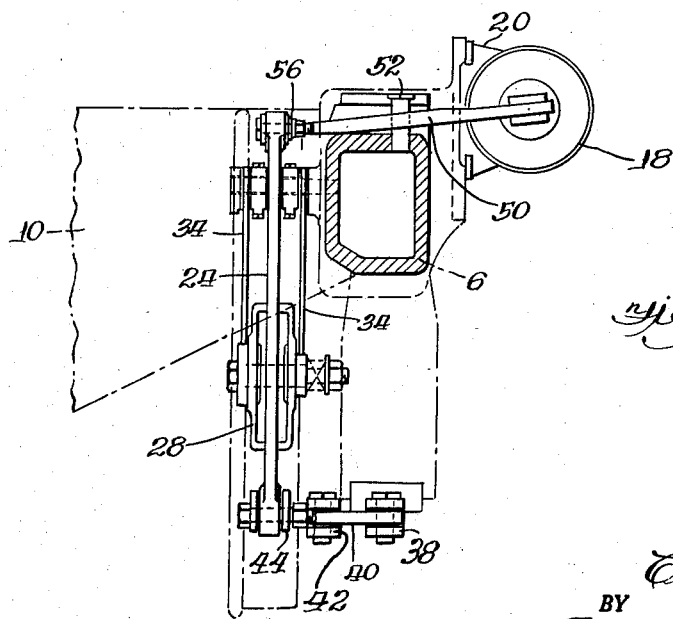
INVENTOR.
Carl E. Tack
BY
Atty.

United States Patent Office 2,827,984
Patented Mar. 25, 1958

2,827,984

CLASP BRAKE

Carl E. Tack, Chicago, Ill., assignor to American Steel Foundries, Chicago, Ill., a corporation of New Jersey Application April 19, 1954, Serial No. 424,085

7 Claims. (Cl. 188—56)

The invention relates to a brake mechanism for a railway car truck and particularly that type of brake known as a clasp brake.

The invention comprehends a novel design of the type of railway brake known as the unit cylinder clasp brake for a four-wheel railway car truck.

It is a major purpose of the invention to eliminate all brake mechanism connections inboardly of the wheels of said truck thereby providing clearance for the mounting of electric motors or other devices.

Specifically, the invention comprehends an actuating power cylinder secured to the outboard side of the truck frame above the wheel, a live shoe carrying brake lever on one side of the wheel, a dead shoe carrying brake lever on the other side of the wheel, auxiliary levers having their opposite ends pivoted to the frame and the respective brake levers, a rod interconnecting the mid-portions of the auxiliary levers, and a dead actuating lever having its opposite ends connected to the upper end of the live brake lever and the power cylinder, respectively.

Figure 1:
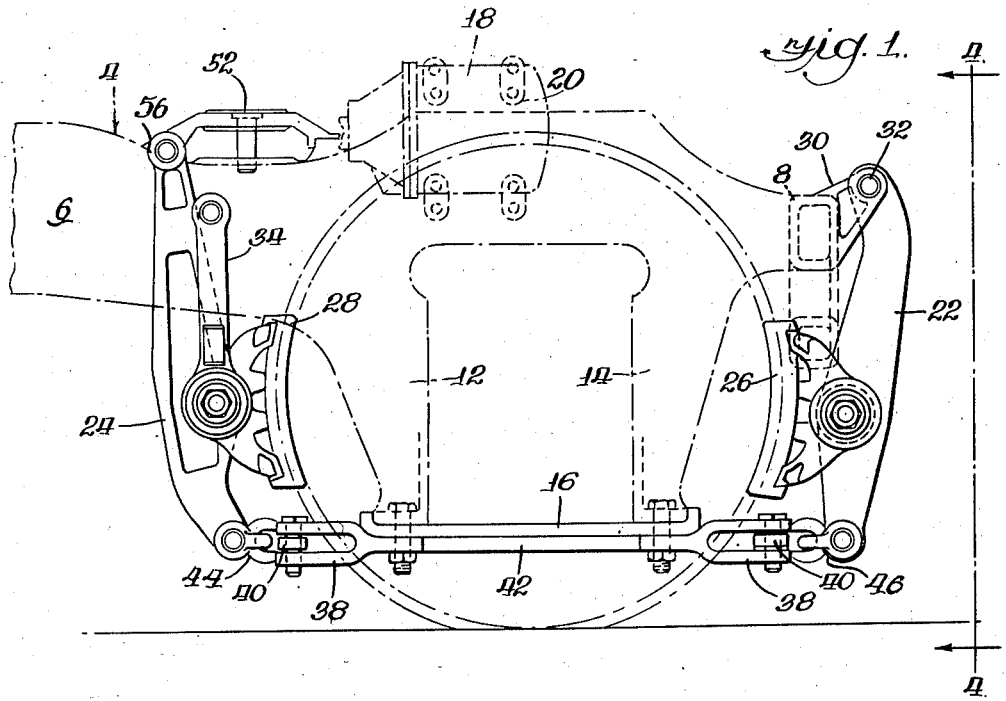
Figure 2:
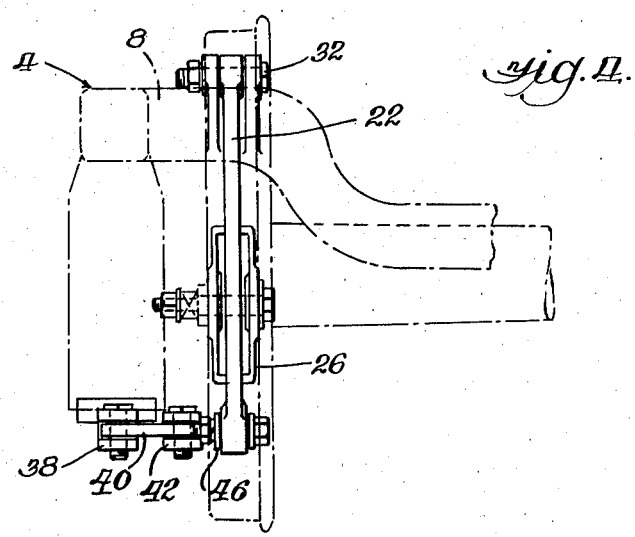

A more thorough understanding of the scope of the invention will be afforded by the following specification and by the attached drawings, wherein:

Figure 1 is a fragmentary side elevational view of a railway car truck incorporating the invention, Figure 2 is a fragmentary plan view of the structure shown in Figure 1, only one quarter of the truck being illustrated inasmuch as the structure shown is duplicated in the other quadrants thereof, Figure 3 is a sectional view taken along line 3—3 of Figure 2, and Figure 4 is an end view taken along line 4—4 of Figure 1.

Describing the invention in detail, the truck comprises a wheel and axle assembly indicated generally at 2. A truck frame 4 is resiliently supported in the conventional manner (not shown) from the wheel and axle assembly 2. The truck frame 4 comprises a side rail 6, a transverse end rail 8 and intermediate transom member 10.

As best seen in Figure 1, the side rail 6 merges with depending pedestal jaws 12 and 14 which movably embrace a journal box (not shown) associated with the wheel and axle assembly 2. A strap 16 interconnects the lower end of the pedestal jaws 12 and 14.

The novel brake arrangement comprises a power cylinder 18 fixedly mounted to a bracket 20 on the external side of the frame 4, approximately above the rotational axis of the wheel and axle assembly. A piston rod 21 extends from one side of the power cylinder 18 and is horizontally movable to actuate the brake mechanism, as hereinafter described.

Brake levers 22 and 24 are mounted on opposite sides of the wheel and carry intermediate the ends thereof brake head-brake shoe assemblies 26 and 28, respectively. Directing attention to the right-hand portion of Figure 1, it will be seen that the brake lever 22 is fulcrumed to a bracket 30 at the upper end thereof, as at 32, said bracket 30 being rigidly secured to the end rail 8. Considering the left-hand portion of Figure 1, it will be seen that the brake lever 24 is a live brake lever, that is, one having no fixed pivot relative to the frame. Brake hangers 34 having their upper ends pivotally connected to the side rail 6 of the frame 4 are pivotally journaled at their lower ends to the brake lever 24 and to the related brake head-brake shoe assembly 28 to movably support the brake lever and assembly from the frame.

As best seen in Figure 1, horizontally extended brackets 38, 38 are fixedly attached to the lower ends of the pedestal jaws 12 and 14, respectively, and auxiliary brake levers 40, 40 have their outboard ends pivotally secured to the brackets 38. A force transmitting or connecting rod 42 is disposed outboardly of the wheel and axle assembly, and as seen in Figure 2, interconnects the mid-portions of the auxiliary levers 40, 40. The inboard end of the left-hand auxiliary lever 40 is clevis or link connected, as at 44, to the lower end of the live brake lever 24. The inboard end of the right-hand auxiliary lever 40 is clevis or link connected as at 46 to the lower end of the dead brake lever 22.

Directing attention to Figures 2 and 3, it will be seen that a dead actuating lever 50 is disposed to extend inboardly of the truck through an appropriate aperture in the side frame 6 and has its mid-portion pin connected to said side rail 6 as at 52. The outboard end of the actuating lever 50 is pivotally connected to the end of the piston rod 21 as at 54. The inboard end of the actuating lever 50 is operatively connected as at 56 to the upper end of the live brake lever 24.

In operation, the cylinder 18 is actuated moving the piston rod 21 leftwardly, as seen in Figure 2, whereby the actuating lever 50 is urged to rotate in a clockwise direction about its pivotal fulcrum 52. Movement of the actuating lever 50 carries the live brake lever to the right, as seen in Figure 1, bringing the associated brake head-brake shoe assembly into engagement with the tread of the wheel on the related side thereof. Continued movement of the actuating lever 50 urges the lower portion of the live brake lever 24 to the left, as seen in Figure 2, whereby the left-hand auxiliary lever 40 is urged to pivot in a counterclockwise direction about its connection to the bracket 38. Movement of the auxiliary lever 40 carries the rod 42 to the left, as seen in Figure 2, whereby the right-hand auxiliary lever 40 is urged to rotate in a counterclockwise direction about its pivotal connection to the associated bracket 38, whereby the dead brake lever 22 is carried to the left, as seen in Figure 1, thus bringing the associated brake head-brake shoe assembly 26 into engagement with the tread on the opposite side of the wheel.

I claim:

1. In a brake arrangement for a railed vehicle, a wheel and axle assembly rotatable on a horizontal axis, a frame supported thereby, a dead brake lever at one side of the assembly having its upper end pivoted to the frame, a shoe on the dead brake lever intermediate its ends and engageable with the adjacent side of the wheel, a live brake lever on the other side of the wheel having a shoe thereon intermediate its ends engageable with the other side of the wheel, a pair of brackets on the frame below the level of said axis, a pair of auxiliary levers having outboard ends pivoted to the respective brackets, one auxiliary lever having its inboard end connected to the lower end of the dead lever and the other auxiliary lever having its inboard end connected to the lower end of the live lever, a rod interconnecting intermediate portions of the auxiliary levers, a power cylinder on the outboard side of the frame above the assembly having a movable piston rod extending from one end thereof, and an actuating lever pivoted to the frame having its opposite ends connected to the piston rod and upper end of the live brake lever, respectively.

2. In a railed vehicle, a wheel and axle assembly, a frame carried thereby, a power cylinder on the frame having a piston rod extending from one side thereof, a dead actuating lever pivoted to the frame and having its outboard end connected to the piston rod, a pair of shoe carrying brake levers on opposite sides of the wheel, a hanger pivoted to the frame supporting one of said levers, auxiliary levers connected to the lower ends of the brake levers and pivoted to the frame, force transmitting means interconnecting the auxiliary levers, and an operative connection between the inboard end of said actuating lever and upper end of the hanger supported brake lever.

3. A railed vehicle according to claim 2, wherein said frame comprises depending pedestal jaws associated with the assembly, and said auxiliary levers are pivoted to the lower ends of said jaws.

4. In a railed vehicle, a wheel and axle assembly, a frame carried thereby, a power cylinder on the frame having a piston rod extending from one side thereof, a dead actuating lever pivoted to the frame and having its outboard end connected to the piston rod, a pair of shoe carrying brake levers on opposite sides of the wheel, one of said brake levers being a live brake lever and the other of said brake levers being a dead brake lever, depending pedestal jaws on the frame, auxiliary levers having their outboard ends pivotally connected to the lower end of said jaws, the inboard end of said dead actuating lever having an operative connection to the upper end of said live brake lever, and a rod interconnecting the mid-portions of said auxiliary levers and located outboardly of the wheel, as seen in plan view.

5. In a brake arrangement for a vehicle having a wheel and axle assembly and a frame carried thereby, the combination of: a power cylinder carried by the frame outboardly thereof, a dead cylinder lever pivoted intermediate its ends to the frame and having its outboard end connected to the power cylinder, a live and a dead vertical brake lever disposed on opposite ends of a wheel of said assembly, said cylinder lever having its inboard end connected to the upper end of said live brake lever, a pair of supports carried by the frame outboardly of the wheel, a pair of auxiliary levers, the outboard ends of said auxiliary levers having operative connections to respective supports, the inboard ends of the auxiliary levers having operative connections to the respective live and dead brake levers at the lower ends of the latter, power transmitting means comprising a pull rod disposed outboardly of the wheel and interconnecting the auxiliary levers intermediate their ends, and friction means carried by the live and dead brake levers intermediate their ends and engaging a friction surface of the wheel for deceleration thereof.

6. In a brake arrangement according to claim 5 wherein said frame comprises depending pedestal jaws, said supports being secured to the lower ends of the jaws, said supports extending substantially longitudinally of the vehicle, said supports having their adjacent ends connected to the pedestal jaws, respectively, and said supports having their remote ends connected to the respective auxiliary levers.

7. In a brake arrangement for a vehicle having a wheel and axle assembly and a frame carried thereby, the combination of: a power cylinder carried by the frame, a dead cylinder lever pivoted to the frame intermediate the ends thereof and having its outboard end connected to the cylinder, inner brake hanger levers carried by the frame at their upper ends and disposed at one end of a wheel of said assembly, friction means carried by the inner levers at the lower ends, said friction means engaging the wheel, a live brake lever extending downwardly between said inner levers and being connected intermediate its ends to the inner levers and friction means, said live brake lever being connected at its upper end to the inboard end of the dead cylinder lever, a dead brake lever disposed on the opposite end of the wheel and being connected at its upper end to the frame, other friction means pivoted to the dead brake lever intermediate the ends of the latter and engaging the wheel, supports carried by the frame, auxiliary levers pivotally connected at their outboard ends to the supports, and a pull bar pivotally interconnecting the auxiliary levers intermediate the ends thereof, said auxiliary levers being connected at their inboard ends to the live and dead brake levers, said pivotal connections, pull bar, live and dead brake levers, supports, auxiliary levers, power cylinder, and dead cylinder lever being disposed outboardly of a vertical plane defining the inboard edge of the related wheel.

References Cited in the file of this patent
UNITED STATES PATENTS

| | | |
|---|---|---|
| 1,197,959 | Schwentler | Sept. 12, 1916 |
| 1,952,649 | Aurien | Mar. 27, 1934 |
| 1,969,159 | Simanek | Aug. 7, 1934 |
| 2,028,623 | Redford | Jan. 21, 1936 |
| 2,148,363 | Aurien | Feb. 21, 1939 |
| 2,245,408 | McGowan | June 10, 1941 |
| 2,446,659 | Mueller | Aug. 10, 1948 |
| 2,472,169 | Mueller | June 7, 1949 |
| 2,494,280 | Baselt | Jan. 10, 1950 |
| 2,606,632 | Schettler | Aug. 12, 1952 |